Patented Nov. 3, 1953

2,658,060

UNITED STATES PATENT OFFICE 2,658,060

PROCESS FOR CENTRIFUGAL SEPARATION OF UREA COMPLEXES FROM ORGANIC MIXTURES

George B. Arnold, Glenham, and Louis Kovach, Beacon, N. Y., assignors to The Texas Company, New York, N. Y., a corporation of Delaware No Drawing. Application November 30, 1949, Serial No. 130,338

5 Claims. (Cl. 260—96.5)

This invention relates to the formation of urea complexes and to the separation of urea complexes from mixtures of organic compounds. More particularly, this invention discloses a method for separating urea complexes from mixtures of organic compounds by centrifugal means.

This invention involves the discovery that a temperature between 120 and 140° F. should be maintained during the centrifugal separation of complexes which are formed by contact of a mixture of organic compounds with an aqueous solution or slurry of urea. It is essential to maintain the specified critical temperature range during centrifugal separation in order to effect clean cut separation of the two phase liquid mixture comprising aqueous slurry of urea complex and organic compounds. When the centrifugal separation is effected at temperature between 120 and 140° F. there is obtained a light stream comprising mainly organic compounds and a dense stream comprising an aqueous slurry of urea complex.

It has recently been discovered that urea forms a solid complex with certain types of organic compound. The class of compounds which complex with urea comprises normal aliphatic hydrocarbons containing at least six carbon atoms, terminal-substituted normal aliphatic hydrocarbons containing at least six carbon atoms, such as n-decanol and n-dodecylbenzene and some methyl-substituted n-aliphatic hydrocarbons. This discovery provides a very useful tool in the resolution of organic mixtures, such as petroleum fractions and the oil product obtained by catalytic conversion of carbon monoxide and hydrogen. Urea complexing is useful both in the isolation of specific compounds, and in the removal of undesirable components from a petroleum fraction. The isolation of straight chain olefins from synthetic gasoline and synthetic gas oil illustrates the utility of urea complexing in the isolation of particular compounds from mixtures. Normal olefins, particularly alpha-olefins which predominate in synthetic fuel, are valuable chemicals and are in demand as starting materials for the Oxo reaction, and as intermediates in the preparation of synthetic detergents and lubricant additives. Dewaxing of petroleum fractions such as gas oil and lubricating oils to produce low pour products illustrates the employment of urea complexing to free a petroleum fraction of undesirable constituents. The main commercial usefulness of urea complexing at the present time lies in the dewaxing of gas oils and other petroleum fractions; low pour diesel fuel is in demand as a jet fuel and for cold weather operation of diesel engines; refrigerator oils characterized by low pour and Freon haze test are required in air-conditioning and refrigeration equipment.

Various procedures have been proposed for effecting formation of urea complexes with organic compounds. It has been proposed that complex formation be effected by contacting an organic mixture with a saturated or supersaturated solution of urea in a polar solvent, such as aliphatic alcohols, aliphatic ketones, water, etc. Complex formation is also effected by contacting an organic mixture with a slurry of urea in a polar solvent. Complex formation is also effected by contacting an organic mixture with a fixed bed of urea; in procedures of this sort the urea is advantageously used in conjunction with a particulate solid, such as Filter Cel, alumina, silica, sand, etc. In all these various techniques for effecting complex formation the presence of a polar compound, such as water, an aliphatic alcohol or an aliphatic ketone expedites complex formation.

Urea complexes are decomposed at elevated temperature over 160° F. and as a matter of fact, substantial decomposition occurs at temperatures over 140° F. Accordingly, complex formation is effected at temperatures between 0 and 150° F. and preferably at temperatures between 80 and 140° F. at which no refrigeration is required. Atmospheric temperature has been found to be a convenient, effective temperature at which to contact urea with a mixture of organic compounds. Apparently, complex formation is not critical to pressure so that pressures ranging from sub-atmospheric to super-atmospheric pressures up to and above 20 atmospheres may be employed. However, atmospheric pressure is ordinarily used to effect complex formation.

The discovery that urea complex formation can be effected by contact of an organic mixture with an aqueous solution or slurry of urea has resulted in substantial economies in the application of urea complexing to commercial operations. The aqueous solution is readily separated from the organic mixture and moreover, residual water is simply removed from the organic mixture so that contamination of organic mixture, such as dewaxed gas oil, is obviated. The aqueous solution employed for urea complexing should be substantially saturated and is preferably super-saturated or an aqueous slurry or urea. Dilute aqueous solutions are not effective for complex formation because the complex is decomposed by the extra dissolving power of a dilute aqueous urea solution. Aqueous solutions or aqueous slurries are mainly employed in forming complexes with lower molecular weight, such as n-aliphatic hydrocarbons; the dewaxing of gas oils illustrates such a use. However, urea in aqueous solution or slurry is also used in the dewaxing of heavier oil stocks.

A plurality of methods have been proposed for separating the complex from the mixture of organic compounds. Simple decantation, filtration and centrifugal separators are the means ordinarily employed to separate the complex from the organic mixture. This invention, however, is concerned solely with the separation of complex from the organic mixture by means of centrifugal separations. Moreover, this invention is further limited to centrifugal separation of complex from a mixture wherein complex formation results from contact of an organic mixture with an aqueous saturated solution or aqueous slurry of urea.

We have discovered that centrifugal separation of a urea complex from a mixture comprising water, organic mixture and solid complex resulting from contact of an organic mixture with an aqueous solution or slurry of urea, can only be effected within a very small critical temperature range of 120 and 140° F. If the centrifuge is operated at temperatures above 140° F., substantial complex decomposition occurs. At temperatures below 120° F. complex is deposited on the surface of the centrifuge bowl with subsequent clogging of the centrifuge. When the temperature is maintained between 120 and 140° F. during centrifugal separation, the aqueous phase is denser than the complex and acts as a carrier therefor. Accordingly, the temperature must be maintained between 120 and 140° F. during separation of urea complex from a mixture comprising organic layer, aqueous phase and solid urea complex.

In effecting centrifugal separation of urea complex in accordance with the process of this invention, it is advisable to effect formation of the complex within the same critical temperature which is prescribed for centrifugal separation. In this preferred modification, an organic mixture containing compounds that will complex with urea is contacted with an aqueous saturated solution or slurry of urea at a temperature between 120 and 140° F. When complex formation is effected at a temperature falling within the critical temperature range, there is no need for temperature adjustment prior to or during centrifugal separation. In any event, the temperature is maintained below 150° F. during complex formation.

As indicated previously, the process of this invention is particularly applicable to treating gas oils to produce low pour oils effective for cold weather diesel operation and as a jet fuel. The process of this invention is illustrated in the following example wherein a gas oil having a pour of +25° F. is contacted with an aqueous slurry of urea whereby after separation of urea complex therefrom in accordance with the process of this invention there is formed a gas oil fraction having a pour of about −20° F. Depending on the amount of urea employed, dewaxed oils of higher or lower pour can be obtained.

*Example*

A gas oil having the following properties is contacted with urea and water:

Gravity, °API _____ 38.4
Pour point, °F _____ +35
Distillation:
    I. B. P., °F _____ 338
    50% _____ 535
    E. P _____ 740
Cetane number _____ 54.0 in the ratio of 140 pounds of urea and 10 gallons of water per barrel of gas oil at about 130° F. The resulting mixture is stirred until the complex between the urea and wax components of the gas oil is formed. The temperature is maintained at about 130° F. and the mixture subjected to continuous centrifuging. Two streams are obtained, the dewaxed gas oil stream from the center of the centrifuge and a water rich stream containing complex and any excess urea not dissolved from the periphery of the centrifuge. The dewaxed gas oil amounts to 83 per cent of the charge gas oil and has a pour point of −20° F. and cetane number of 52.0.

The water rich stream containing the urea wax complex and excess urea is removed from the continuous centrifuge as a slurry and heated to about 160° F. which causes the complex to decompose and the urea to dissolve. From the heat exchanger the mixture of molten wax and a water solution of urea is taken to a settler. The molten wax, removed, from the top of this settler amounts to 17 per cent of the charge gas oil and is composed almost entirely of normal paraffin hydrocarbons. The urea water solution is recycled and contacted again with fresh gas oil charge.

In the foregoing example there is described a preferred modification of the subject invention wherein contact of the organic mixture with urea in aqueous medium is effected at a temperature falling within the 120–140° F. range prescribed for centrifugal separation. It will be recognized that contact of urea and organic mixture can be effected at temperatures below the prescribed separation temperature; in such instances, a temperature adjustment is required prior to centrifugal separation.

Obviously, many modifications and variations of the invention as hereinbefore set forth may be made without departing from the spirit and scope thereof, and therefore only such limitations should be imposed as are indicated in the appended claims.

We claim:

1. In a process involving formation of complexes comprising urea and organic compounds containing a normal aliphatic chain of at least six carbon atoms by contacting aqueous urea at a temperature below 150° F. with a mixture containing said compounds, said aqueous urea being selected from the group consisting of saturated urea solution and a urea slurry, the improvement which comprises effecting separation of said resulting complex-containing mixture consisting of water and said organic compounds by centrifuging at a temperature between 120 and 140°

F. whereby there are obtained an organic light stream and a dense aqueous stream containing said complex.

2. A process according to claim 1 in which contact of urea with the organic mixture is effected at a temperature between 120 and 140° F.

3. In a process involving the formation of complexes comprising urea and normal aliphatic hydrocarbons containing at least six carbon atoms by contacting aqueous urea at a temperature below 150° F. with an organic mixture containing said aliphatic hydrocarbons, said aqueous urea being selected from the group consisting of saturated urea solution and a urea slurry, the improvement which comprises effecting separation of said resulting complex-containing mixture consisting of water and said hydrocarbons by centrifuging at a temperature between 120 and 140° F. whereby there are obtained a light hydrocarbon stream and a dense aqueous stream containing said complex.

4. A process according to claim 3 in which contact of aqueous urea with said organic mixture is effected at a temperature between 120 and 140° F.

5. A process according to claim 3 in which gas oil is the organic mixture.

GEORGE B. ARNOLD.
LOUIS KOVACH.

References Cited in the file of this patent

UNITED STATES PATENTS

| Number | Name | Date |
| --- | --- | --- |
| 2,499,820 | Fetterly | Mar. 7, 1950 |
| 2,557,257 | Melrose | June 19, 1951 |

OTHER REFERENCES

Bengen, Technical Oil Mission Reel 143, pages 2 to 6, May 22, 1946.